United States Patent [19]

Zwart

[11] Patent Number: 5,645,228
[45] Date of Patent: Jul. 8, 1997

[54] SAFETY SHIELD FOR SPREADER

[75] Inventor: Richard K. Zwart, Vestal, N.Y.

[73] Assignee: Herman N. Zwart, Johnson City, N.Y.

[21] Appl. No.: 404,860

[22] Filed: Mar. 15, 1995

[51] Int. Cl.$^6$ .................................................. A01C 17/00
[52] U.S. Cl. .................................... 239/687; 239/288
[58] Field of Search .................................. 239/288, 681, 239/687, 689

[56] References Cited

U.S. PATENT DOCUMENTS

| 579,049 | 3/1897 | Eltzroth | 239/687 |
| 3,523,648 | 8/1970 | Garber | 239/687 X |
| 4,032,074 | 6/1977 | Amerine | 239/687 X |
| 4,234,131 | 11/1980 | Baker | 239/687 X |
| 4,895,306 | 1/1990 | Whitehurst, Jr. | 239/288 |
| 5,340,033 | 8/1994 | Whitell | 239/681 X |
| 5,370,321 | 12/1994 | Bianco | 239/666 |

FOREIGN PATENT DOCUMENTS 106012  4/1963  Netherlands ......................... 239/687

Primary Examiner—Andres Kashnikow
Assistant Examiner—Steven J. Ganey
Attorney, Agent, or Firm—Salzman & Levy

[57] ABSTRACT

The invention features three types of shielding for rotary spreaders. The shields protect the user against spreader blow-back, i.e., most materials that are radially thrust outwardly from the rotary paddle of the spreader, are blocked from impinging upon the operator. The different shields of this invention are: (a) a molded, thin, clear, plastic plate; (b) a V-shaped, thin, clear, plastic plate; and (c) a rectangular-shaped, wrap-around, thin, clear, plastic housing having a protective top plate. Each shield plate attaches to the tubular frame at the rear of the spreader by removable, semi-circular tube/conduit fasteners for ease of assembly or removal. The shield plate can also be attached by permanently fixtured screw fasteners.

4 Claims, 4 Drawing Sheets

SAFETY SHIELD FOR SPREADER

FIELD OF THE INVENTION

The present invention pertains to lawn-care devices and, more particularly, to a rotary spreader apparatus for dispersing chemicals, fertilizers and other lawn and turf materials without dangerously exposing the user thereto.

BACKGROUND OF THE INVENTION

Of paramount concern recently is that safety conditions in the workplace and at home be even better. In particular, protection from exposure to toxic or otherwise irritating chemicals is considered of utmost importance. Rotary spreaders are commonly used today to apply chemicals, fertilizers and other materials to grassy areas about workplaces and homes. The rotary spreader has become a preferred spreading apparatus due to the wide throw caused by its rotating paddle in the dissemination of the granules and/or other substances about the lawn.

It is also not uncommon to find that operators of these spreading devices are forced, sometimes by law, to wear protective clothing, boots, masks and other shielding equipment to protect against the thrust of these chemicals and/or other materials upon their persons. On hot summer days, protective clothing and rubber boots can be heavy and uncomfortable. Many equipment operators often choose to neglect their safety, preferring to remain cool and unencumbered.

Granules still tend to find their way into cuffs, pockets and other crevices of clothing, even when equipment operators are properly attired and seemingly protected. This situation is the result of the high kinetic energy imparted to the materials by the rotary paddle necessary to obtain the wide throw. This imparted energy causes the granules to spread rearwardly onto a person's clothing.

When workers perspire, the dissolution of trapped chemical granules can then cause irritation and dermatological reactions. Even chemicals which have not yet broken down or disintegrated can find their way into the home and workplace via a worker's clothing, thus posing a safety threat to the health of individuals.

It is observed that merely providing protective clothing is not enough to furnish a safe working environment to users of rotary spreader equipment. The present invention proposes to protect against materials being thrust at an individual at the source of the problem, viz., the rotating paddle.

Heretofore, attachments to spreaders have been relegated to mechanisms that deflect material as it is scattered by the spreader in order to confine the application of such material to a given area of lawn or garden. For example, U.S. Pat. No. 5,370,321, issued to BIANCO, discloses a deflecting guard for a broadcast spreader. Three inclined plates are individually adjustable and positioned at right angles to one another in order to prevent dry material from being scattered outside a selected zone of application. Such a deflecting guard is mounted at the front of the spreader and does nothing to protect an individual who is operating the spreader.

U.S. Pat. No. 3,523,648, issued to GARBER, discloses another spreader attachment. This attachment is for use with a motorized tractor, the rotating paddle being powered by a power shaft from the tractor. A control apparatus is provided to control the discharge of material from the hopper onto the spreader plate or paddle. A shield is provided for preventing the material being spread from traveling rearwardly toward the tractor and operator. This shield plate is bent inwardly and lies in the plane perpendicular to the direction of travel. No structure is provided for wrapping around the spreader plate, even partially. Moreover, removal and cleaning of the shield plate requires disassembly of the entire apparatus with respect to the motorized tractor.

The current invention is for a shielding device that attaches at the rear of a rotary spreader. This shielding device prevents the backward blow of materials in the direction of the operator. In this respect, the shield of this invention eliminates or reduces the normal spread of backward flow onto the operator and his protective clothing and boots.

The shield apparatus of the invention comprises three embodiments: (a) a molded back shield with partial wrap-around housing, (b) a V-shaped back shield; and (c) a rectangular-shaped, wrap-around housing having a protective top plate. None of these embodiments hinders the dissemination or affects the circumferential spread pattern of the spreader because the shield is displaced a sufficient distance from the paddle so as not to inhibit such spread pattern. Notwithstanding this fact, the inventive shield can be used with all appropriate spreaders without inhibiting flow rate or inherent operating controls of the spreader.

SUMMARY OF THE INVENTION

In accordance with the present invention, there are provided three shielding embodiments for rotary spreaders. The shields protect the user against "spreader blow-back", i.e., the materials that are radially thrust outwardly from the rotary paddle of the spreader are blocked from impinging upon the operator. The shield embodiments of the invention comprise: (a) a molded, thin, clear, plastic plate with a partial wrap-around housing; (b) a V-shaped, thin, clear, plastic plate; and (c) a rectangular-shaped, wrap-around, thin, clear, plastic housing having a protective top plate. Each shield plate attaches to the tubular frame at the rear of the spreader via snap-on, semi-circular tube/conduit fasteners for ease of assembly or removal. The shield plate is also attached by permanently fixtured screw fasteners.

It is an object of this invention to provide an improved, rotary-type spreading apparatus.

It is another object of the invention to provide a safety shield for attachment to rotary-type spreaders that protects the operator from material being thrust in the wake of the rotary paddle of the spreader.

It is a further object of this invention to provide a safety shield for attachment to rotary-type spreaders that protects the operator from materials that spread outwardly towards the operator because of the kinetic energy imparted by the rotating paddle.

It is yet another object of the invention to provide a shield for a rotary-type spreader that limits the operator's exposure to kinetically thrust materials from the spreader, while also not interfering with the ability of the operator to operate and adjust the spreader apparatus.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a shield by which granules or particles being thrust backwardly from a rotary paddle of a rotary-type lawn spreader can be diverted from impinging upon the operator pushing the spreader. The shield protects the operator from kinetically-thrust granules and particles dispersed by the rotating paddle, as well as materials spreading outwardly towards the operator.

Figure 1:
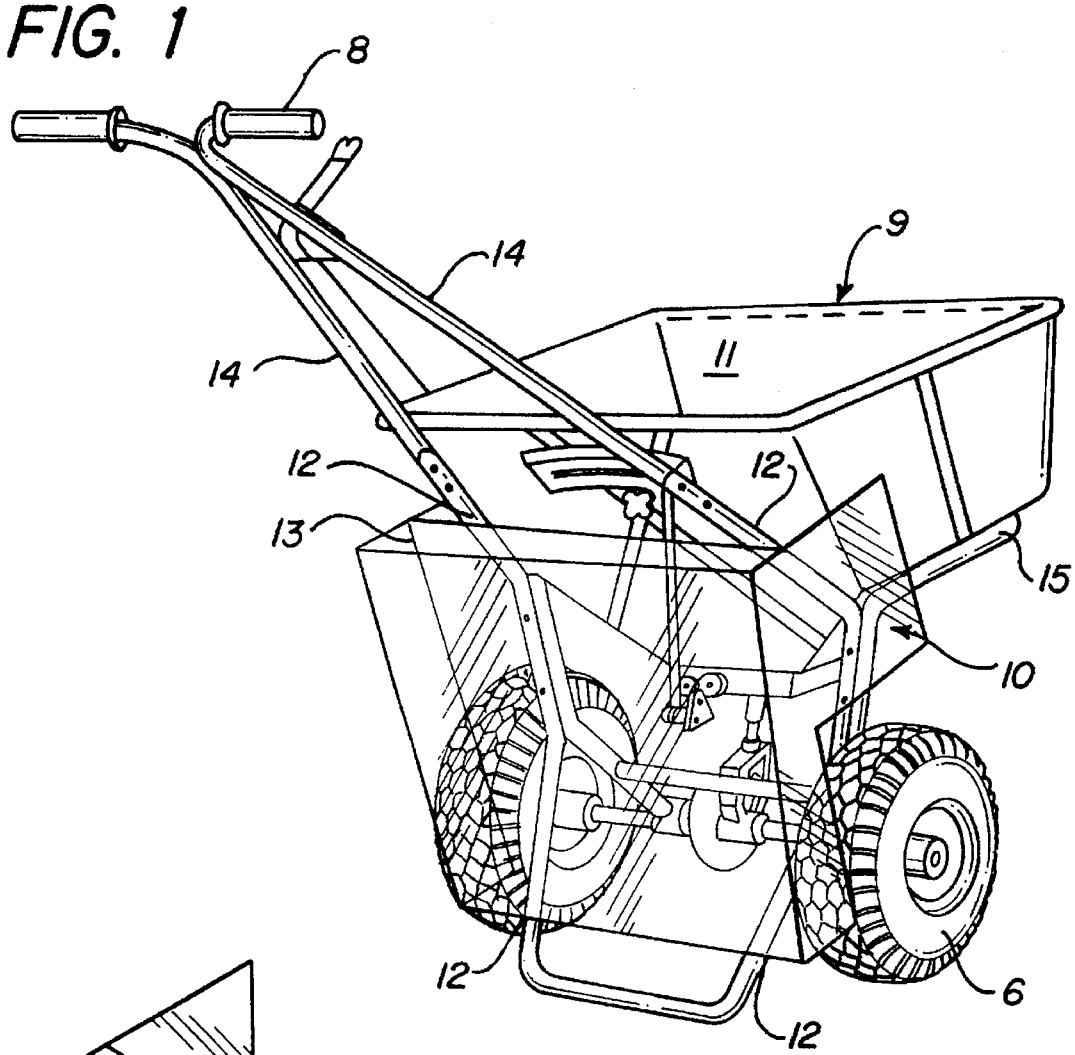
FIG. 1 illustrates a perspective, schematic, in situ view of the first embodiment of this invention, featuring a top plate and a wrap-around housing attached to the rear portion of a rotary spreader.
Figure 2:
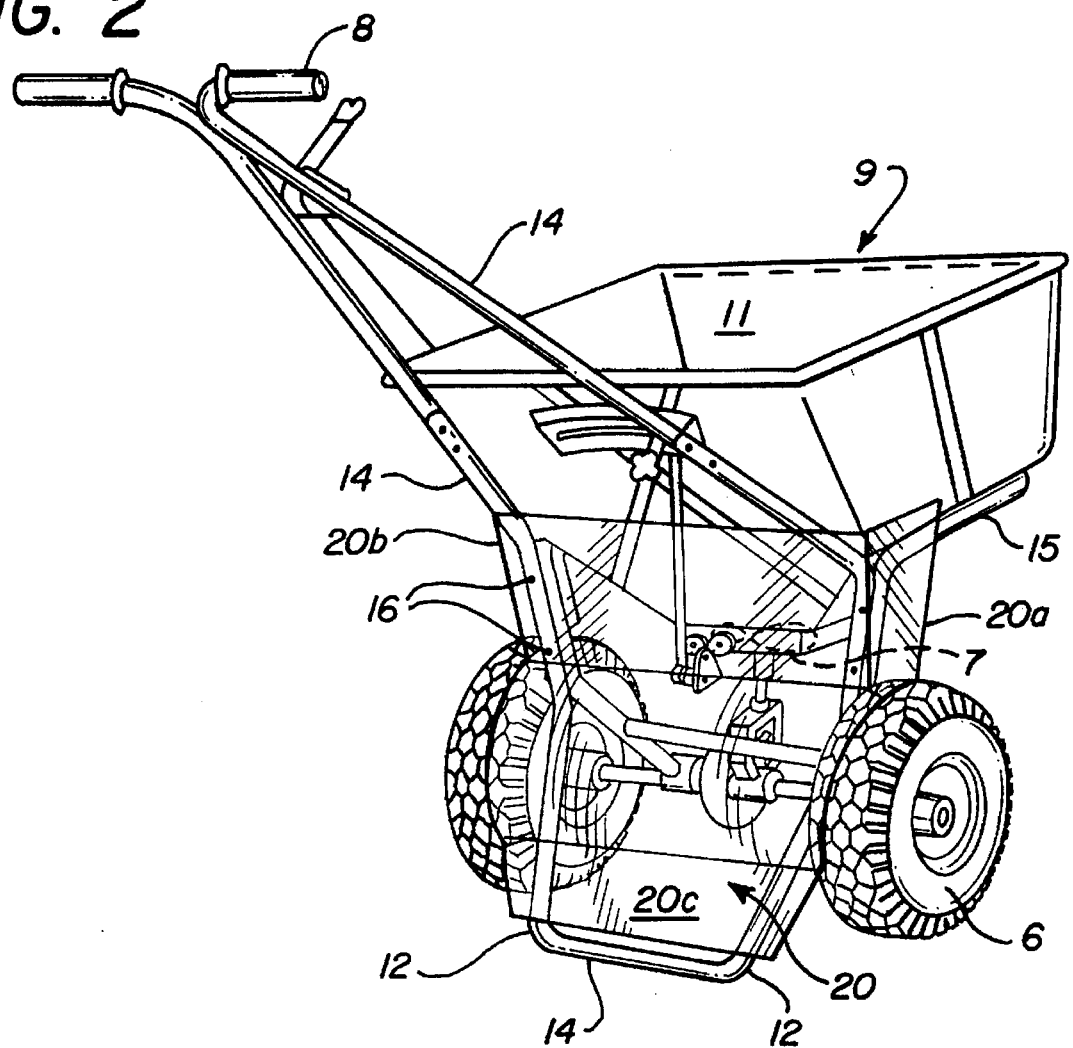
FIG. 2 shows a perspective, schematic, in situ view of the second embodiment of the invention, featuring a molded plate with partial wrap-around sections attached between the frame elements at the rear portion of a rotary spreader.

Now referring to FIG. 1, a spreader 9 is shown having a hopper 11, supported by a tubular hopper frame 15, for holding a given quantity of lawn-care material (such as fertilizer, weed control granules or other applicable particles befitting the cultivation art). The spreader 9 is thrust forward by means of a handle 8 supported by a tubular handle frame 14. The materials (not shown) in the hopper 11 are caused to drop out through an adjustable slot (not shown) in the bottom of the hopper 11, thereby impinging upon a rotating paddle 7, shown in phantom lines (FIG. 2). As known in the art, the paddle 7 disperses the materials in a 180° arc, as the spreader 9 is propelled forward on wheels 6.

Figure 1A:
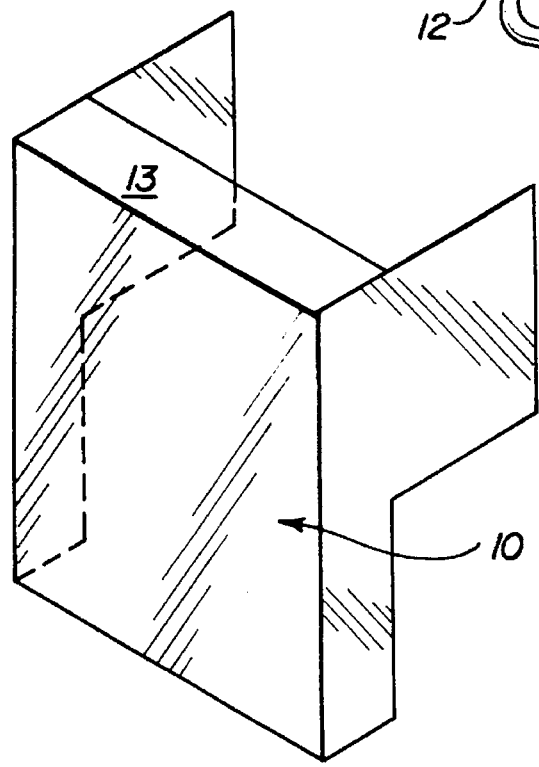
FIG. 1a depicts a perspective view of the first shield embodiment shown in FIG. 1.

In accordance with the first embodiment of this invention, shield 10 is attached to the tubular frame handle 14 at the rear portion of hopper 11 by means of tube/conduit fasteners 12. The shield 10 (also illustrated in FIG. 1a) comprises a thin, transparent, rectangular-shaped, wrap-around plastic housing. A thin, transparent, plastic plate or lid 13 is permanently attached to the upper portion of shield 10 by suitable means. The shield 10 prevents most granules or particles that are being thrust from the rotary paddle 7 from being blown backwardly.

Figure 2A:
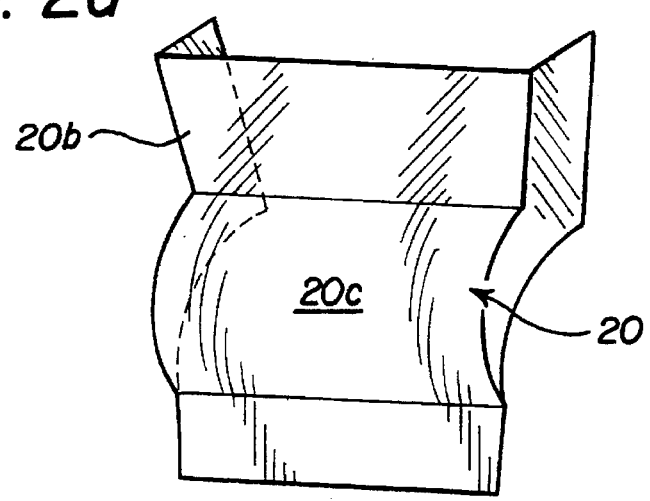
FIG. 2a illustrates a perspective view of the second, molded plate embodiment depicted in FIG. 2.

Referring to FIG. 2, a second embodiment of the invention is shown. A shield 20 is attached to the handle frame 14 and rear portion of hopper 11 of spreader 9. The shield 20 (also depicted in FIG. 2a) comprises a molded, substantially rectangular plate 20c and side portions 20a, 20b forming a part thereof. The shield 20 operates in like manner as the shield 10 of FIG. 1. Shield 20 is attached to spreader 9, between handle frame 14 and hopper frame 15, by removing frame bolts 16 and interposing the shield 20, before reassembling frames 14 and 15. Shield 20 is molded so as to conform outwardly at the lower portion to the shape of handle frame 14.

Figure 3:
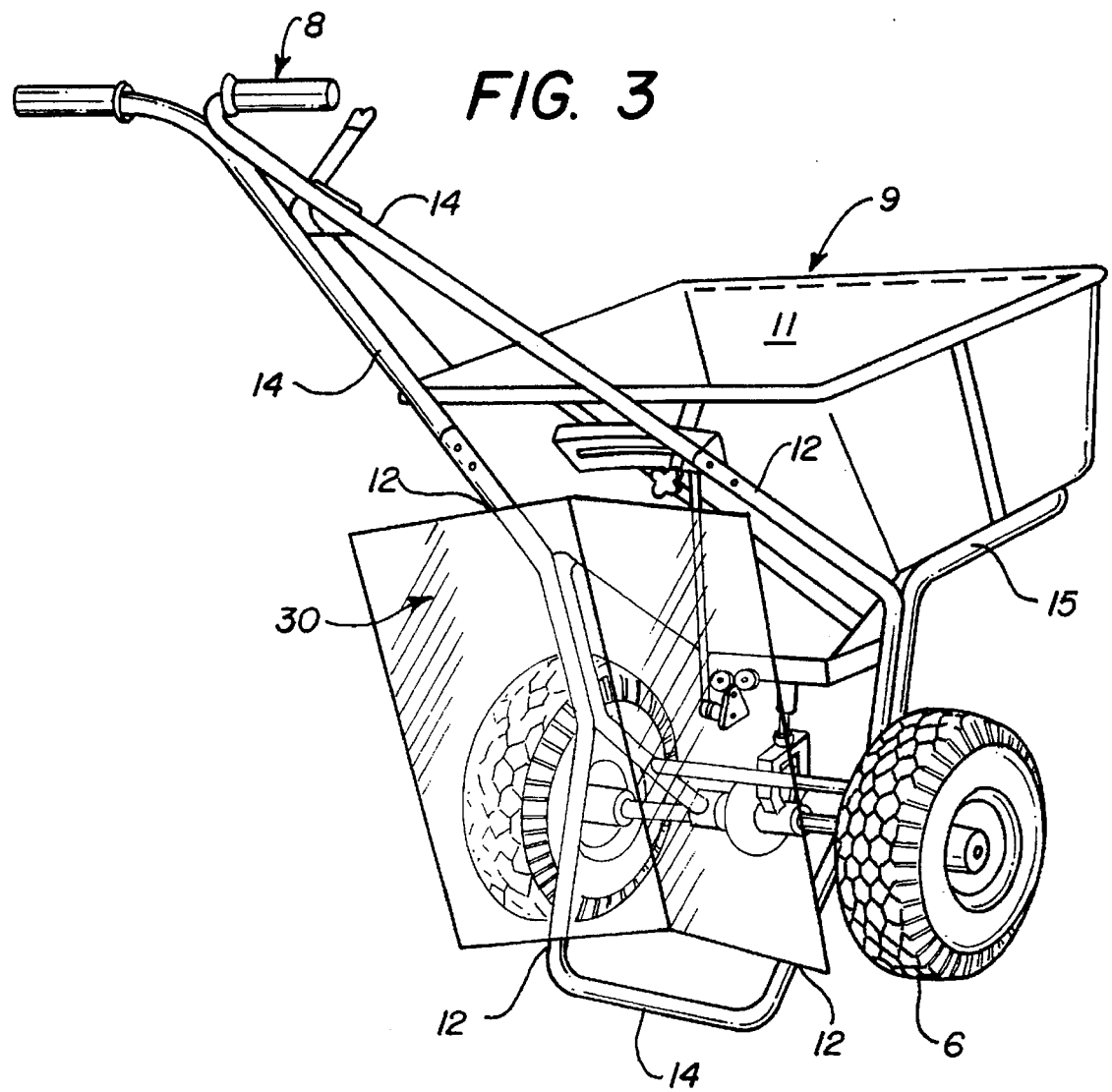
FIG. 3 shows a side, schematic, in situ view of the third embodiment of the invention, featuring a V-shaped plate attached to the rear portion of a rotary spreader.
Figure 3A:
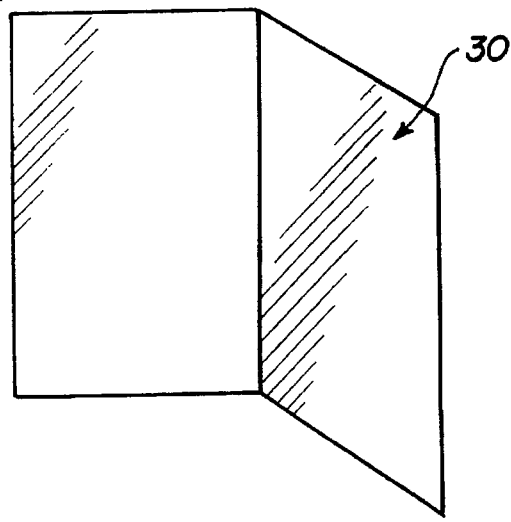
FIG. 3a illustrates a perspective view of the third, V-shaped plate depicted in FIG. 3.

Referring to FIG. 3, a third embodiment of the invention is shown. Shield 30 is attached to the handle frame 14 and rear portion of hopper 11 of spreader 9. The shield 30 (also depicted in FIG. 3a) comprises a V-shaped, rectangular, transparent plate that operates in like manner as shields 10 and 20 in FIGS. 1 and 2, respectively. Shield 30 is attached to spreader 9 in a like manner as shield 10 shown in FIG. 1.

The shields 10, 20 and 30 can each be fabricated from typical, transparent plastic material, such as Lexan®, PETG, CAB, styrene, etc.

Figure 4:
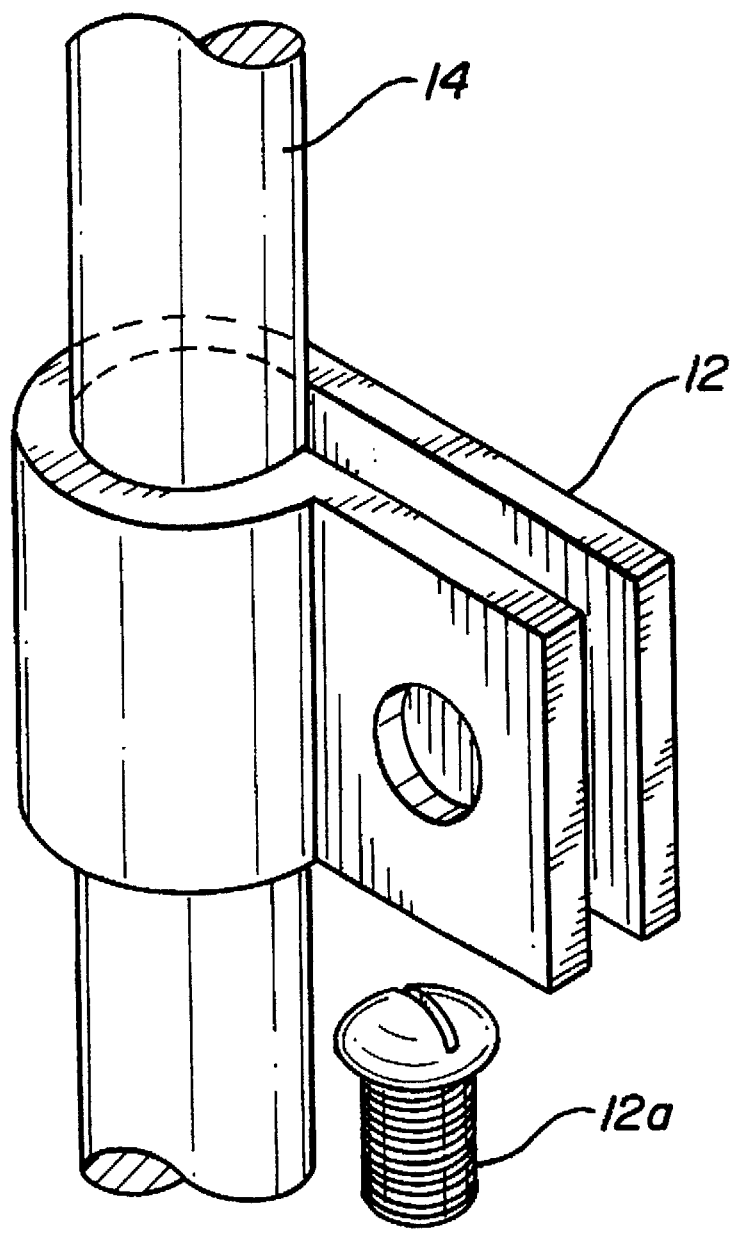
FIG. 4 depicts a perspective view of a typical, snap-around tube/conduit fastener for quick assembly of the shield embodiments shown respectively in FIGS. 1a, 2a and 3a to the tubular frame of a rotary spreader.

Referring to FIG. 4, a portion of a typical tubular handle frame 14 is shown. Shield 10, 20 or 30, respectively, can be attached to the tubular frame 14, for ease of assembly or removal thereof, by means of tube/conduit fasteners 12, which are attached to the shield by screws 12a. In this fashion, the shield embodiments can each be easily removed from spreader 9 for purposes of cleaning or replacement.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A safety shield for a rotary-type spreader that protects an operator of said rotary-type spreader against spreader blow-back, and other bouncing materials, whereby granules, particles and lawn-care materials that are radially thrust outwardly from a rotary paddle of the spreader are blocked from impinging upon the operator, said spreader comprising wheels carried upon a tubular frame that includes two handle sections, said safety shield comprising a plastic plate with partial wrap-around portions that forms a transparent, rectangular housing, said plate being removably connected to said spreader at a rear portion of said tubular frame, about said two handle sections, said safety shield further forming an L-shaped, cut-out section in said transparent, rectangular housing about said wheels, and having an upper lid to prevent particles from bouncing upwardly toward said operator.

2. The safety shield in accordance with claim 1, wherein said spreader comprises tubular handle construction, and said plate is removably connected to said rear portion of said spreader by removable tube/conduit fasteners.

3. A safety shield in combination with a rotary-type spreader, the shield protecting an operator of said rotary-type spreader against spreader blow-back and other bouncing materials, whereby granules, particles and lawn-care materials that are radially thrust outwardly from a rotary paddle of the spreader are blocked from impinging upon the operator, said spreader comprising wheels carried upon a tubular frame that includes two handle sections, said safety shield comprising a V-shaped, rectangular, transparent, plastic plate that is removably connected to a rear portion of said tubular frame of said spreader, said V-shaped, rectangular, transparent, plastic plate having a vertical bifurcation of its V-shape disposed between said two handle sections.

4. The safety shield in accordance with claim 3, wherein said spreader comprises tubular handle construction, and said V-shaped plate is connected to said rear portion of said spreader by removable tube/conduit fasteners.

\* \* \* \* \*